(12) United States Patent
Paradiso et al.

(10) Patent No.: US 6,370,113 B1
(45) Date of Patent: Apr. 9, 2002

(54) METHOD AND APPARATUS FOR RESELECTION OF DATA TRUNK UPON CONNECTION FAILURE

(75) Inventors: Mike Paradiso, Pierrefonds; Claude Gauthier, Richelieu, both of (CA)

(73) Assignee: Telefonaktiebolaget LM Ericsson (publ) (SE)

( * ) Notice: Subject to any disclaimer, the term of this patent is extended or adjusted under 35 U.S.C. 154(b) by 0 days.

(21) Appl. No.: 09/121,392

(22) Filed: Jul. 23, 1998

(51) Int. Cl.[7] .............................................. H04M 11/00
(52) U.S. Cl. ............................. 370/225; 379/35; 379/7
(58) Field of Search ...................... 379/7, 35; 370/225, 370/227, 228

(56) References Cited

U.S. PATENT DOCUMENTS

| | | | |
|---|---|---|---|
| 5,590,171 A | | 12/1996 | Howe et al. ................ 379/33 |
| 5,627,819 A | | 5/1997 | Dev et al. ................... 370/250 |
| 5,881,132 A | * | 3/1999 | O'Brien et al. ............. 379/35 |
| 5,930,698 A | * | 7/1999 | Bertacchi ................... 455/405 |
| 5,940,376 A | * | 8/1999 | Yanacek et al. ............ 370/250 |
| 6,084,948 A | * | 7/2000 | Otake ......................... 379/35 |

OTHER PUBLICATIONS

PCT International Search Report for PCT/SE99/01175 mailed Oct. 12, 1999.

* cited by examiner

*Primary Examiner*—Melvin Marcelo
(74) *Attorney, Agent, or Firm*—Jenkens & Gilchrist

(57) ABSTRACT

A method and apparatus for monitoring voice and data telephone calls by a law enforcement agency, wherein separate monitoring connections for each party to the call are established. Upon determining that a particular call is to be monitored, the group switch attempts to establish a plurality of separate connections between each multiple point (MUP) on the group switch that receives voice or data signals from one of the parties to the call and one or more monitoring centers. If the connection associated with the primary party to be monitored fails, the group switch reroutes signals received from the primary party to a successful connection of the plurality of attempted connections.

31 Claims, 4 Drawing Sheets

METHOD AND APPARATUS FOR RESELECTION OF DATA TRUNK UPON CONNECTION FAILURE

BACKGROUND OF THE INVENTION

1. Technical Field of the Invention

The present invention relates to the monitoring of telephone calls by law enforcement agencies and, in particular, to the selection of a preferred connection between a monitoring center and one of the parties to a monitored telephone call.

2. Description of Related Art

It is well known in the art for law enforcement agencies to tap telecommunications trunk connections for the purpose of monitoring voice conversations and data transmissions (calls). Telecommunications switches in the network are programmed with a stored list of telephone numbers assigned to subscribers whose calls are to be monitored. Whenever a group switch handles a call connection having a calling party or called party identification number matching a number on the stored list, the group switch establishes a connection (comprising the "tap") with a monitoring center. Voice or data signals from the calling party side are monitored using a first switch connection, while monitoring of the voice or data signals from the called party side requires a second switch connection.

Typically, if the request for the establishment of the tap is granted, the group switch routes the first and second switch connections to a conference call device, which mixes the signals from the first and second switch connections. The group switch then establishes a single connection to the monitoring center over which the mixed signal is routed. The monitoring center receives the mixed signal and feeds it to a recording device or some type of monitoring sensor.

In some instances, it is desirable to establish two or more separate tap connections to the monitoring center (i.e., one connection for each of the parties). In this case, when a switch handles a call connection having a calling party or called party identification number matching a number on the stored list, the switch establishes a first connection with the monitoring center for the calling party side and a second connection with the monitoring center for the called party side of the communication. The monitoring center feeds these connections to separate recording devices or monitoring sensors. This arrangement allows the law enforcement agency to, for example, easily distinguish which signals are originating from each of the parties.

In existing monitoring systems that use the two connection scenario, however, problems sometimes arise with the setup of one of the two connections. The connection request can fail, for example, because the particular monitoring center number towards which the switch directs the connection request is busy or because there is a malfunction in the telecommunications network or in the monitoring center. Thus, a connection is established for one of the parties but not for the other. When one of the connection requests fails in this manner, the remaining connection or connections are dropped, and neither party to the conversation or data transmission is monitored. There are situations, however, in which it is desirable to continue monitoring the signals originating from one of the parties even when monitoring of another party is not possible. Thus, there is a need for a method and system for maintaining one monitoring connection to a call and for enabling monitoring of a selected one of the parties when a second monitoring connection to the call fails.

SUMMARY OF THE INVENTION

The present invention comprises a method and apparatus for monitoring a call connection by a law enforcement agency involving the reselection of a monitoring trunk to provide monitoring of a primary party to a call connection. In accordance with the invention, a list of directory numbers marking those subscribers to a telephone network whose calls are to be monitored is stored in a network switching node. Each time a call setup request is received in the switching node, the calling party and called party directory numbers contained in the request are compared against the stored list of "marked" subscribers. When a call setup request is received involving one or more "marked" subscribers, the call is identified as a call to be monitored. A group switch that is handling the call connection attempts to set up separate connections with a monitoring center for each of the parties to the call to be monitored. Generally, data or voice transmissions from each of the parties to the call are received by the group switch at a particular multiple point (MUP). By establishing a connection between the particular MUP associated with each party to the call and a respective monitoring center, each party can be separately monitored. This ability to separately monitor the parties is particularly valuable in the case of data transmissions, where it is often difficult to distinguish the source of a data transmission if the parties' transmissions are mixed on a single monitoring connection with the monitoring center.

In some cases, however, one of the separate attempted connections fails. There are two methods for addressing this problem in accordance with the present invention. In the first method, a determination is made as to which party is the primary party to be monitored. The primary party is determined according to preselected criteria stored at the switching node. Once a failure of one of the multiple attempted connections is detected, it is determined whether the primary party connection is the failed connection. If not, the successful connection(s) are maintained and those portions of the call associated with the successful connection(s) (including signals received from the primary party) are monitored. If the primary party connection has failed, however, the group switch reroutes signals from the primary party to a successful connection. Accordingly, a new connection within the switch is established connecting the primary party MUP with a successful connection between the group switch and the monitoring center, and monitoring of the primary party is provided.

In the second method for dealing with a failed connection, it is first determined which party to the call is the primary party according to preselected criteria. Signals received at the MUP associated with the primary party are then routed to the first successful connection between the group switch and the monitoring center. Again, monitoring of at least the primary party is provided.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
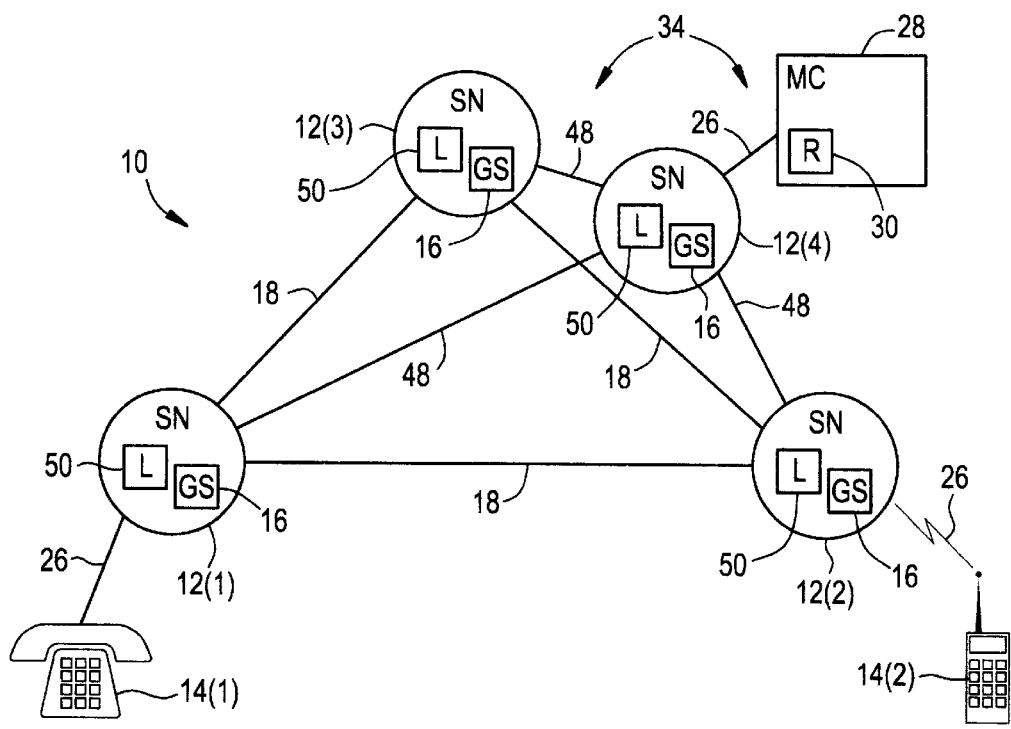
FIG. 1 is a block diagram of a portion of a telecommunications network for establishing call connections and for monitoring selected call connections by a law enforcement agency.

Reference is now made to the Drawings wherein like reference characters denote like or similar parts throughout the various Figures. Referring now to FIG. 1, there is shown a block diagram of a portion of a telecommunications network 10 including a plurality of switching nodes 12 interconnected by communication trunks 18. The communication trunks 18 carry voice and data signals between the various switching nodes 12. Although only three switching nodes 12 are shown, it will be understood that the network 10 likely includes many more switching nodes. It will also be understood that the network 10 can be a cellular telephone network or a public switched telephone network (PSTN). Each switching node 12 includes one or more group switches 16 that route calls through the network.

Assume now that a call originates with a calling party (A-party) subscriber station 14(1), which can comprise either a cellular subscriber station (not shown) or a wireline subscriber station (shown). Furthermore, the call may comprise a data call, such as a fax or modem connection, or a voice call. The call is further assumed to have been dialed to the directory number of a called party (B-party) subscriber station 14(2), who can also comprise either a cellular subscriber station (shown) or a wireline subscriber station (not shown). The call is delivered to a first switching node 12(1) by a wireline or radio connection 26, is routed through the network 10 across communications trunks 18 by a plurality of group switches 16 in the switching nodes 12, and, finally, is routed to the directory number of the called party subscriber station 14(2). A call connection between the A-party and the B-party is thereby established.

Law enforcement agencies are often authorized to monitor telephone calls to obtain evidence for use in criminal investigations. To accomplish this goal, a monitoring center (MC) 28 is established which may include one or more tape recorders (R) 30 or other monitoring devices for recording or detecting the voice conversation or data transmission that is being monitored. The physical connection with the voice portion of the telephone network 10 which enables monitoring is made through a tap (generally shown at 34) wherein signals are routed across a communication trunk 48, through a switching node 12(4), and to a monitoring center 28 via a connection 26. The communication trunks 48, the switching node 12(4), and the connection 26 provide plural voice and data communications paths used to carry subscriber station 14 communications to the monitoring center 28 and the recorders 30 therein. The tap 34 may be made at any location within the telephone network 10 in a manner well known to those skilled in the art, but is typically made through a requesting one or ones of the switching nodes 12 connected to the subscriber in a wireline network or where the subscriber to be monitored is currently located (roaming) in a cellular network. The law enforcement agency monitoring center 28 utilizes the tap 34 to monitor the communication (which may be recorded by tape recorder 30 for future use).

Each switching node 12 is programmed with a stored list (L) 50 of directory numbers for those subscribers whose calls are to be monitored by a law enforcement agency. When a switching node 12 handles a leg of a call and can match a calling or called party identification associated with that leg to an entry on the stored list 50, the group switch 16 handling the call transmits a request for a tap connection 34 to the monitoring center 28.

Figure 2:
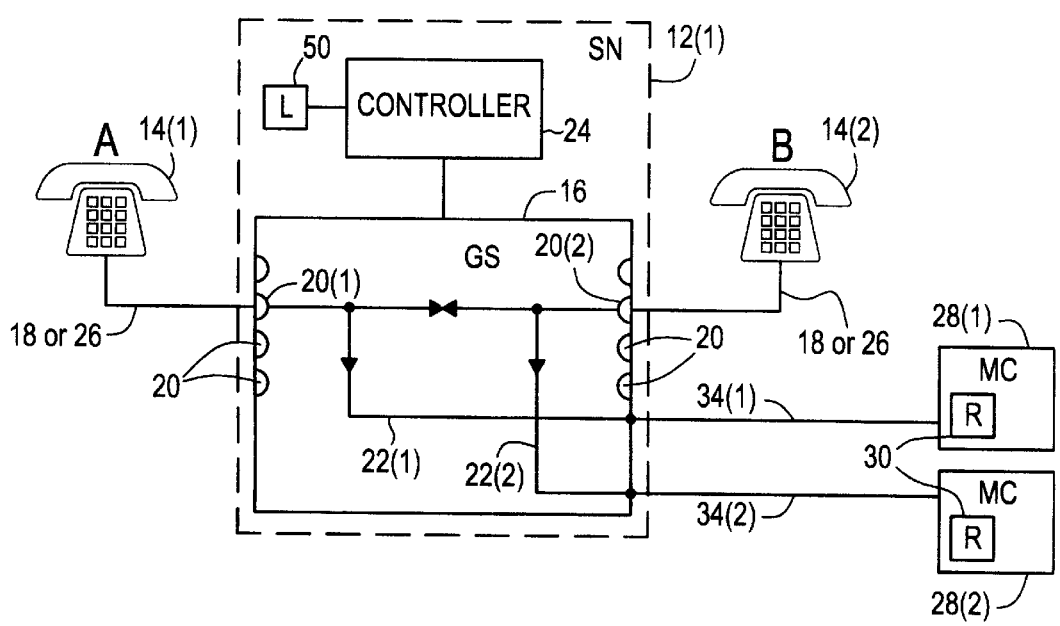
FIG. 2 is a block diagram of a switching node in a telecommunications network illustrating a method for separate monitoring of each party to a call connection.

Referring now to FIG. 2, there is illustrated a block diagram of a switching node 12(1) connecting a calling party subscriber station 14(1) with a called party subscriber station 14(2), wherein one of the parties is marked to be monitored (i.e., a marked subscriber). Although only one switching node 12(1) and one group switch 16 are shown, it will be understood that the call connection between the calling party subscriber station 14(1) and the called party subscriber station 14(2) will generally be routed through a plurality of switching nodes 12, and the group switches 16 contained therein, located in one or more networks 10. The group switch 16 includes a plurality of multiple points (MUPs) 20 for receiving incoming communications signals for a subscriber station 14 either from another switching node 12 via one of the communication trunks 18 or from one of the connections 26 in a switching node 12 that is connected to a subscriber station 14. Each of the parties to a call connection is associated with a particular MUP 20 in the group switch 16. Voice or data communication signals originating from the calling party subscriber station 14(1) are received by the group switch 16 at a first MUP 20(1), while communication signals originating from the called party subscriber station 14(2) are received by the group switch at a second MUP 20(2). By establishing a connection between each MUP 20 and an MC 28, a call associated with the particular MUP 20 can be monitored. To facilitate this monitoring, switch connections 22(1) and 22(2) are established with the first and second MUPs 20(1) and 20(2) to connect the tap 34 such that both sides of the conversation or communication can be monitored. Each switch connection 22 can then be connected to the corresponding MC 28 over tap 34 for purposes of monitoring the call connection.

The operation of the group switch 16 in accordance with the present invention will now be discussed in further detail. Upon receipt of a call setup request in the originating switching node 12(1), the A-party number and the B-party number are individually compared against the stored list 50. If there is a match, then a switch controller 24 in the switching node 12(1) notifies the group switch 16 that is handling the call that the call is to be monitored. As a result, the group switch 16 attempts to establish a first tap connection 34(1) between the first MUP 20(1) and a first MC 28(1) for monitoring the A-party subscriber station 14(1) and a second tap connection 34(2) between the second MUP 20(2) and a second MC 28(2) for monitoring the B-party subscriber station 14(2). A recording device 30 at each MC 28 then records the signals received across each of the tap connections 34(1) and 34(2). When two or more tap connections 34 are established, one of the connections is often referred to as the primary connection, while the remaining connection or connections are the secondary connections. In most cases, the primary connection is the party whose directory number has been marked for monitoring.

In many monitoring systems, the switch connections 22(1) and 22(2) are mixed together and a single connection transmitting both sides of the call connection is established between the group switch 16 and the MC 28. By establishing two separate connections, however, each party can be separately monitored, and it is much easier to distinguish between signals originating from the calling party subscriber station 14(1) and signals originating from the called party subscriber station 14(2).

Furthermore, although tap connections 34 to separate MCs 28 are shown for illustrative purposes, it will be understood that, in a preferred embodiment, the first tap 34(1) and the second tap 34(2) are made to a single MC 28. The taps 34(1) and 34(2) can then be routed to different recording devices 30 in the MC 28 to monitor each end of the communication or can be routed to a single recording device 30, assuming that a record is kept of which portions of the signals are received from each of the respective connections.

It should also be noted that a call connection can involve more than two parties. In such a case, a separate connection can be established for each of the multiple parties. In the alternative, the signals from some of the parties can be combined. For example, a first tap connection 34(1) might be established for the marked subscriber, while the other parties to the call are combined in a second tap connection 34(2).

Assuming that both or all of the attempted tap connections 34 are successful, the use of separate connections has substantial benefits. In practice, however, one of the two or more tap connections 34 between the MC 28 and the group switch 16 sometimes fails. When such a failure occurs in current systems, the successful connection or connections are typically automatically terminated. Thus, none of the parties to the communication can be monitored.

In accordance with the method and system of the present invention, a successful tap connection 34 between the group switch 16 and the MC 28 is maintained even if another of the requested connections fails. Furthermore, upon failure of one of the tap connections 34, the status of the successful connection and of the failed connection is evaluated to determine a preferred (or primary) party for monitoring purposes. The criteria upon which the preferred party is determined depends upon what portion (i.e., side) of the communication the law enforcement agency anticipates to be the most important or useful. For example, the criteria may select as the preferred party the party whose directory number is marked for monitoring. Alternatively, the criteria may select as the preferred party the party to a monitored communication that is transmitting (i.e., originating) a facsimile or some other type of data transmission.

Moreover, the preferred party criteria may differ for different types of communications. The preferred party might vary, for example, between outgoing calls vs. incoming calls, voice calls vs. data calls, or fax calls vs. other types of data calls, or the criteria might select the preferred party according to some combination of these various exemplary distinctions. In cases where there are more than two parties to a call connection (e.g., a conference call), more sophisticated selection criteria may be necessary. In a situation where there are three parties (one calling party and two called parties), for example, the criteria should account for the possible failure of one or two connections. In other words, if one connection out of three attempted connections fails, the criteria should specify which two parties are preferred. Similarly, if two connections fail, the criteria should specify which party, of the three attempted parties, is preferred.

Generally speaking, an algorithm for determining the preferred party according to the desired criteria is stored in a memory in the switch controller 24, and software in the switch controller 24 uses the stored algorithm to select the preferred party when one of the connections fails. The switch controller 24 then directs the group switch 16 to route the signals received at the MUP 20 associated with the preferred party to the successful connection. The monitoring system of the present invention, therefore, allows law enforcement agencies to obtain the benefits of having a separate connection for each party to a call without risking the loss of all monitoring capabilities if one of the tap connections 34 fails. In addition, the system allows the agency to select which party is monitored in the event that one or more of the connections fails.

Figure 3:
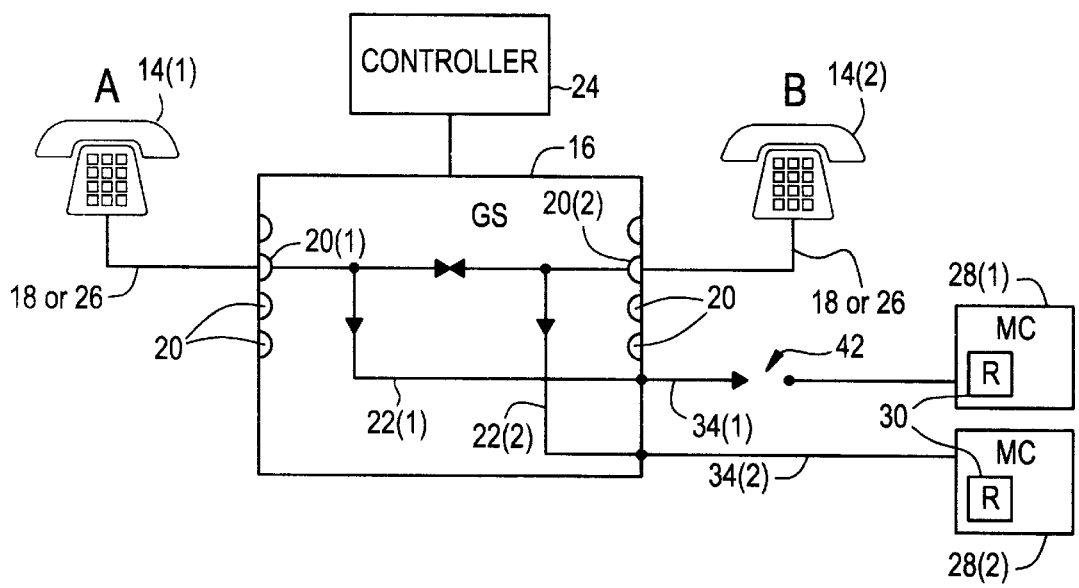
FIG. 3 is a block diagram of the switching node of FIG. 2 wherein one of the separate monitoring connections has failed.
Figure 4:
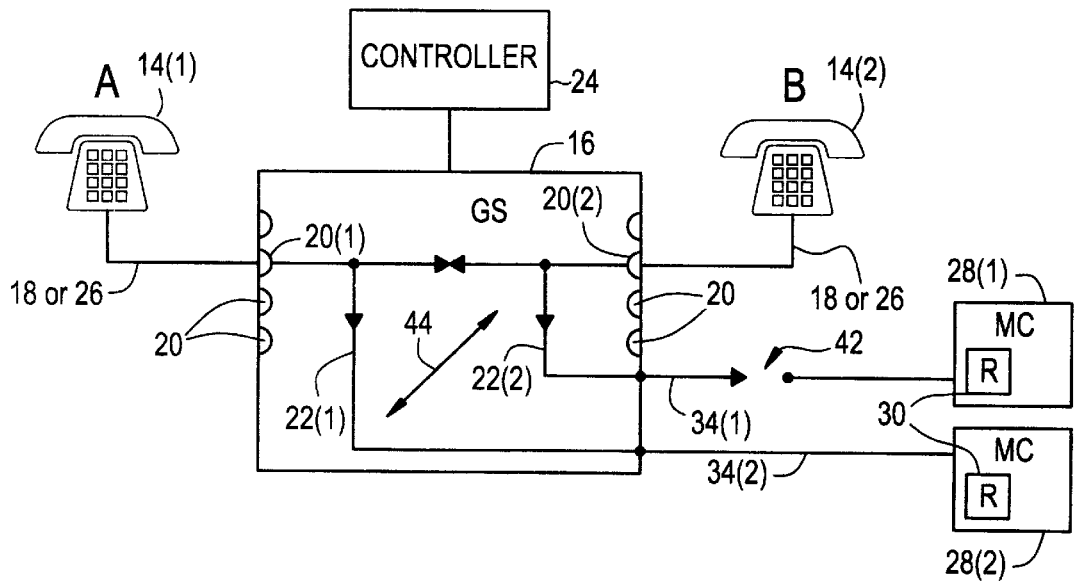
FIG. 4 is a block diagram of the switching node of FIG. 3 wherein the signals received from the A-party of the call connection have been rerouted to a successful second monitoring connection in response to a failure of a first monitoring connection.

Referring now to FIGS. 3 and 4, there is illustrated, respectively, a block diagram of a group switch 16 in an initial attempt to establish two separate connections with MCs 28 and a block diagram of a group switch 16 wherein the switch connections 22 have been reselected upon connection failure. It is assumed that a call setup request has been received from a calling party subscriber station 14(1) to establish a call connection with a called party subscriber station 14(2). Furthermore, it is assumed that the switch controller 24 has determined that the calling party is a marked subscriber and has directed the group switch 16 to establish a tap 34 of the call connection, as discussed above.

Accordingly, referring now to FIG. 3, the group switch 16 attempts to establish a first tap connection 34(1) between the first MUP 20(1) and a first MC 28(1) for monitoring the calling party subscriber station 14(1) and a second tap connection 34(2) between the second MUP 20(2) and a second MC 28(2) for monitoring the called party subscriber station 14(2). However, the first tap connection 34(1) fails (as indicated generally at 42), while the second tap connection 34(2) is successful. After performing a preferred party inquiry, the switch controller 24 determines that the calling party is the primary (preferred) party and that the called party is the secondary party. Monitoring of the calling party subscriber station 14(1) over the successful connection is therefore desired.

Referring now to FIG. 4, the routing of the switch connections 22 inside the group switch 16 is reselected in response to the failed connection of FIG. 3. Accordingly, while maintaining the second tap connection 34(2), the first switch connection 22(1) is redirected (as generally indicated at 44) to link the first MUP 20(1) with the second tap connection 34(2), and the second switch connection 22(2) is redirected to link the second MUP 20(2) with the failed first tap connection 34(1). Alternatively, the second switch connection 22(2) is simply dropped. In any event, the reselection of switch connections 22 establishes a tap 34 to MC 28 so that the primary party can be monitored.

Figure 5:
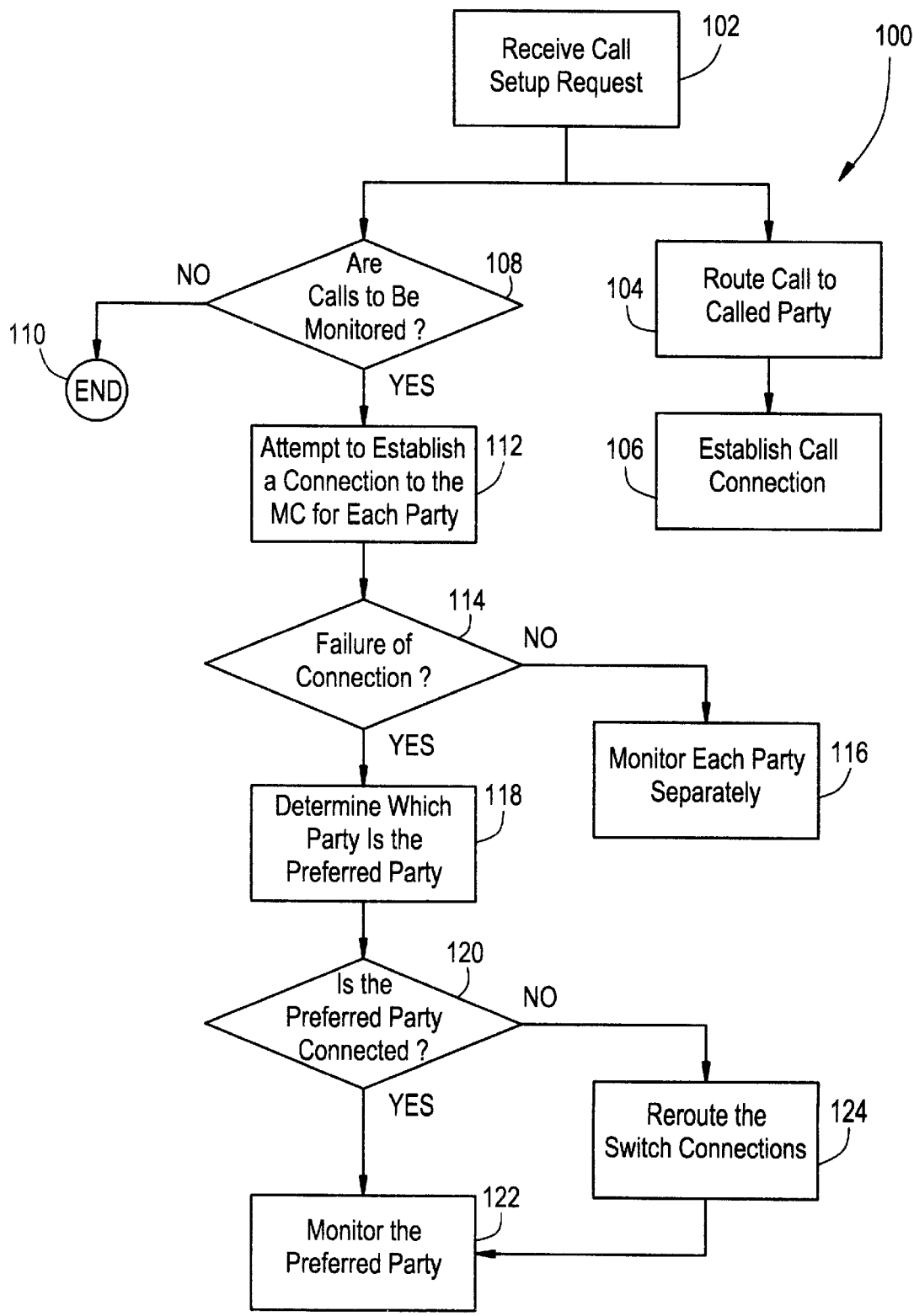
FIG. 5 is a flow diagram of a method for reselection of a monitoring connection to provide monitoring for a primary party to a call connection in accordance with a preferred embodiment of the present invention.

Referring now to FIG. 5, there is illustrated a flow diagram of a method 100 for reselecting switch connections in accordance with a preferred embodiment of the present invention. In an initial step 102, a call setup request is received by a switching node 12. The group switches 16 in the switching node 12 route the call in accordance with the called party number portion of the call setup request at step 104, and a call connection is established at step 106. Upon receipt of the call setup request and concurrently with step 104, a determination is made at step 108 as to whether calls from the calling party subscriber station 14(1), or calls to the called party subscriber station 14(2), are to be monitored by a law enforcement agency. If not, the process ends at step 110. If either party is marked to be monitored, however, separate one-way connections are attempted at step 112 from a MUP 20(1) associated with the calling party subscriber station 14(1) to an MC 28 and from a MUP 20(2) associated with the called party subscriber station 14(2) to an MC 28. Then, at step 114, it is determined whether either one of the attempted connections failed. If both of the connections were successful, separate monitoring of each party is performed at step 116. If one of the connections fails, a set of preferred party criteria is examined at step 118 to determine which of the parties to the call is the preferred party.

Next, at step 120, it is determined whether the initial connection attempt with the preferred party was successful. If the connection with the preferred party was successful, then monitoring of the preferred party occurs at step 122. On the other hand, if the connection with the preferred party failed, reselection of the switch connections occurs at step 124 such that voice or data communications from the preferred party are rerouted to the successful MC connection, and monitoring of the preferred party then occurs at step 122.

Figure 6:
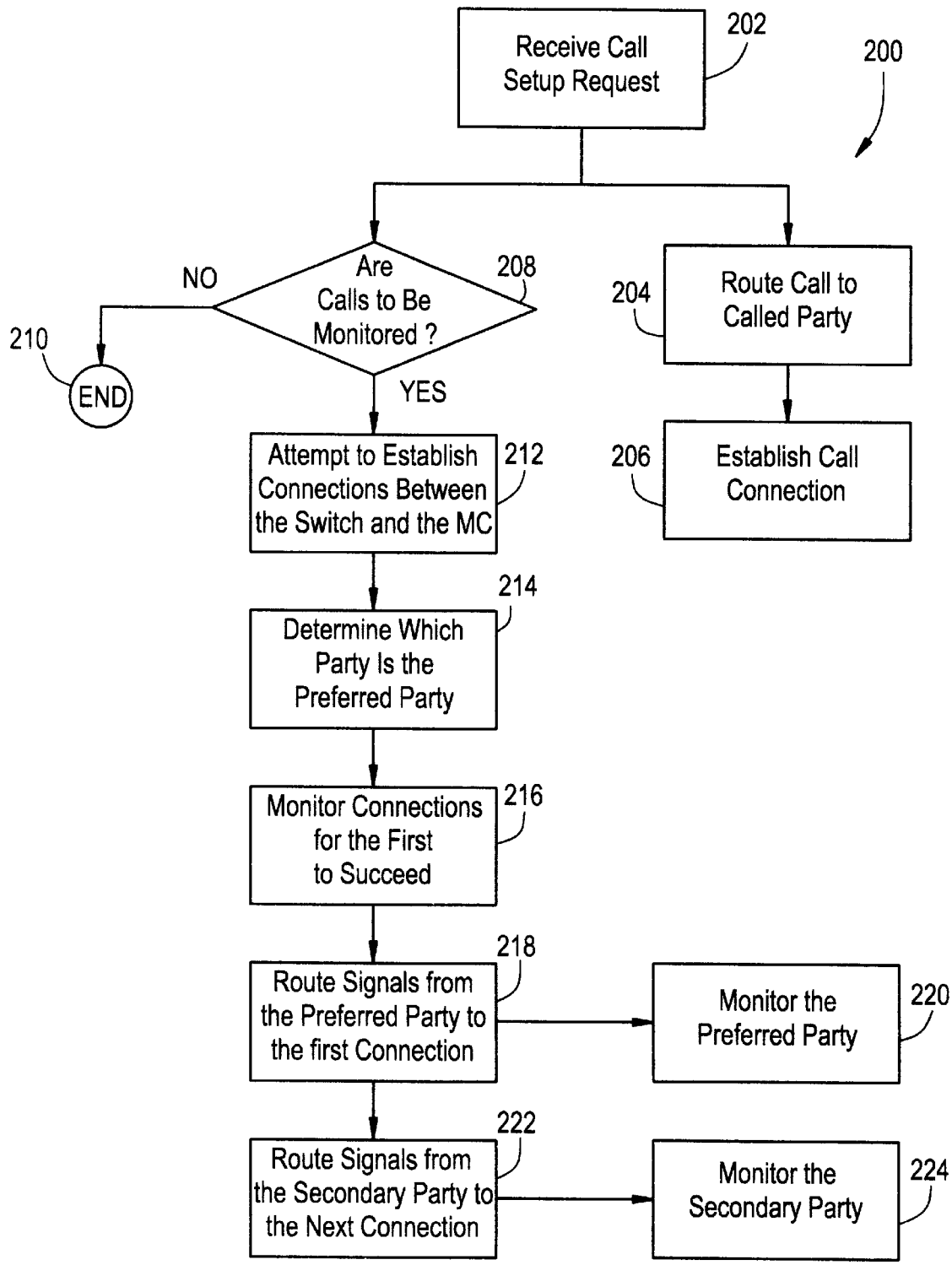
FIG. 6 is a flow diagram of an alternative method for establishing a monitoring connection in accordance with the present invention.

Now referring to FIG. 6, there is illustrated a flow diagram of an alternate method 200 for selecting switch connections in accordance with an alternative embodiment of the present invention. A call setup request is received by a switching node 12 in an initial step 202; the group switches 16 in the switching node 12 route the call in accordance with the called party number portion of the call setup request at step 204; and a call connection is established at step 206. Upon receipt of the call setup request and concurrently with step 204, a determination is made at step 208 as to whether the call is to be monitored. If not, the process ends at step 210. If either party is marked to be monitored, multiple separate one-way connections are attempted from the group switch to an MC 28 at step 212. However, instead of associating each connection attempt with a particular party, each connection attempt is not initially connected (e.g., via switch connections 22 as in the preferred method 100) to either party to the call. Next, a set of preferred party criteria is examined at step 214 to determine which of the parties to the call is the preferred party. At step 216, the attempted connections are monitored to determine which is the first to succeed. Signals from the preferred party are routed to the first successful connection by establishing a switch connection 22 at step 218, and monitoring of the preferred party begins at step 220. Signals from the remaining party or parties are routed to the next successful connection (or connections) at step 222, assuming that there is another successful connection, and separate monitoring of the remaining party begins at step 224.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for monitoring a telephone call connection by a law enforcement agency, comprising the steps of:
    determining that a call between a plurality of parties is to be monitored;
    attempting to establish, in response to said determination, a plurality of connections with a monitoring center for monitoring the plurality of parties;
    detecting a failure to establish at least one of said attempted connections; and
    rerouting communications received from said failed connection to a successful one of the attempted connections in response to said detection of a failed connection.

2. The method of claim 1, further comprising the step of selecting a preferred party to monitor.

3. The method of claim 2, wherein said step of detecting a failed connection comprises detecting a failure in establishing a connection between the preferred party and said monitoring center.

4. The method of claim 3, wherein the step of rerouting communications comprises rerouting communications received from said preferred party to a successful one of the attempted connections.

5. The method of claim 2, wherein said rerouting communications further comprises the steps of:
    disconnecting a portion of a successfully connected trunk connecting the monitoring center and one of the parties to the call to be monitored; and
    reestablishing a new path of said trunk, wherein the new path connects the monitoring center and the preferred party.

6. The method of claim 5 wherein said disconnecting of a portion of the successfully connected trunk includes disconnecting an internal connection in a group switch.

7. The method of claim 2 wherein said call to be monitored comprises a data call.

8. The method of claim 7 wherein said step of selecting comprises the step of automatically selecting as the preferred party a party that is a source of a data transmission.

9. The method of claim 2 wherein said step of selecting a preferred party further comprises the step of evaluating a set of preferred party criteria to select a preferred party from said plurality of parties.

10. The method of claim 1, wherein the plurality of attempted connections comprises a separate attempted connection for each of the plurality of parties.

11. The method of claim 1 wherein said step of attempting to establish a plurality of connections comprises transmitting a call setup request to set up a call between a switching node through which the call to be monitored is routed and the monitoring center.

12. A method for monitoring a telephone call connection by a law enforcement agency, comprising the steps of:
    determining that a call between a plurality of parties is to be monitored;
    attempting to establish a plurality of connections with a monitoring center for monitoring the plurality of parties;
    selecting a preferred party to monitor; and
    establishing a connection between said preferred party and the monitoring center over a first successful one of the attempted connections.

13. The method of claim 12, further comprising the step of establishing a connection between a second one of the plurality of parties and the monitoring center over a second successful one of the attempted connections.

14. The method of claim 12 wherein said call to be monitored comprises a data call.

15. The method of claim 14 wherein said step of selecting comprises the step of automatically selecting as the preferred party a party that is a source of a data transmission.

16. The method of claim 12 wherein said step of selecting a preferred party further comprises the step of evaluating a set of preferred party criteria to select a preferred party from said plurality of parties.

17. The method of claim 12 wherein the plurality of attempted connections comprises a separate attempted connection for each of the plurality of parties.

18. The method of claim 12 wherein said step of attempting to establish a plurality of connections comprises transmitting a call setup request to set up a call between a switching node through which the call to be monitored is routed and the monitoring center.

19. A system for monitoring a telephone call by a law enforcement agency, comprising:

at least one monitoring center for monitoring a call connection; and a switch for establishing said call connection between a subscriber to be monitored and at least one other subscriber to a telecommunications network and for establishing a plurality of monitoring connections to said at least one monitoring center, said switch rerouting signals received from a preferred one of said subscribers to a successful monitoring connection with the at least one monitoring center upon failure of a monitoring connection between the preferred one of said subscribers and the at least one monitoring center.

20. The system of claim 19, further comprising a memory for storing information identifying said subscriber to be monitored.

21. The system of claim 19, further comprising a switch controller for selecting the preferred subscriber according to stored selection criteria.

22. The system of claim 19, wherein said switch includes a plurality of multiple points (MUPs), each subscriber in said connection associated with a particular MUP.

23. The system of claim 22, wherein each of said monitoring connections comprises:

an external connection between the switch and the monitoring center; and an internal connection inside said switch, said internal connection connecting said external connection to a MUP associated with one of the subscribers in said call connection.

24. The system of claim 23 wherein the switch reroutes the internal connection connected to the MUP associated with the preferred subscriber upon failure of the external connection for the preferred subscriber, said rerouting to a successful external connection.

25. A system for monitoring a telephone call by a law enforcement agency, comprising:

at least one monitoring center for monitoring a call connection; and a switch for establishing said call connection between a subscriber to be monitored and at least one other subscriber to a telecommunications network and for establishing a plurality of monitoring connections to said at least one monitoring center, said switch routing signals received from a preferred one of said subscribers to a first successful monitoring connection with the at least one monitoring center.

26. The system of claim 25, further comprising a memory for storing information identifying said subscriber to be monitored.

27. The system of claim 25 further comprising a switch controller for selecting the preferred subscriber according to stored selection criteria.

28. The system of claim 25 wherein said switch includes a plurality of multiple points (MUPs), each subscriber in said connection associated with a particular MUP.

29. The system of claim 28 wherein each of said monitoring connections comprises an external connection between the switch and the monitoring center, the system further comprising an internal connection inside said switch, said internal connection connecting said external connection to a MUP associated with one of the subscribers in said call connection.

30. The system of claim 29 wherein the internal connection connected to the MUP associated with the preferred subscriber is routed to a first successful external connection.

31. The system of claim 30 wherein the internal connection connected to a MUP associated with a second one of said subscribers is routed to a second successful external connection.

* * * * *